June 21, 1955     C. M. SHEPHERD     2,711,047
THUMB REST FOR FISHING ROD
Filed May 18, 1953
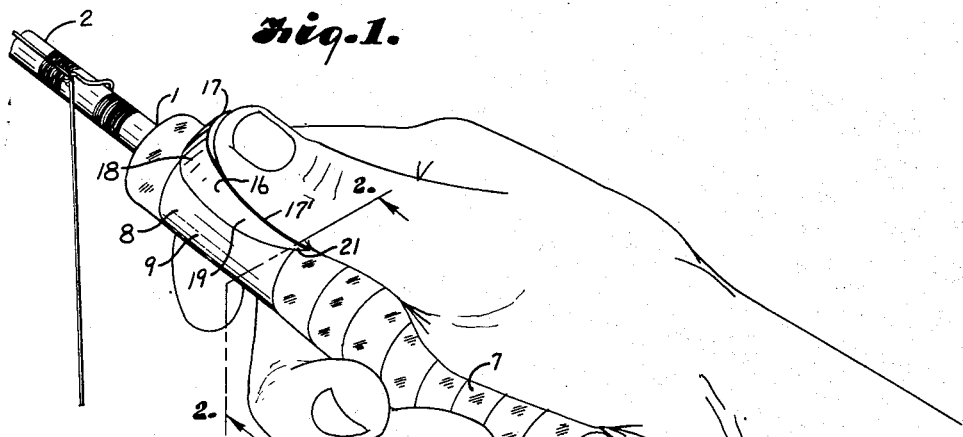
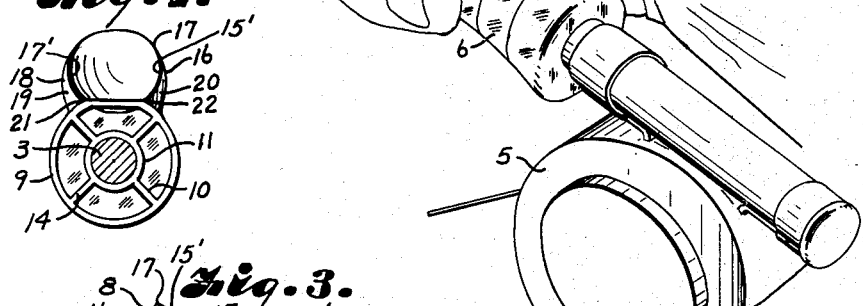
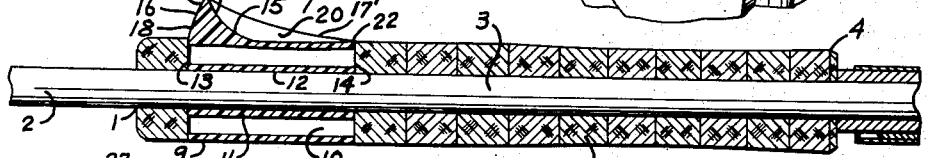
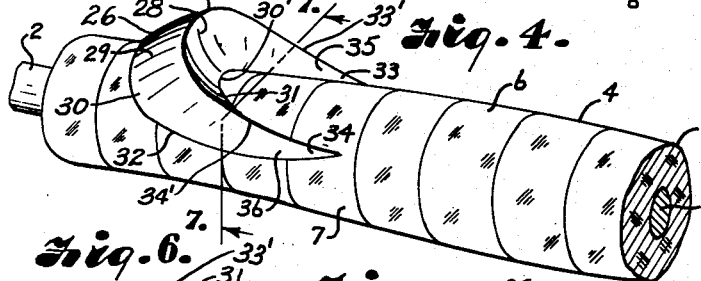 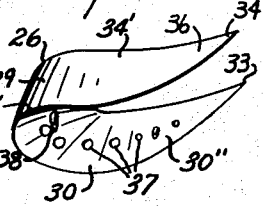
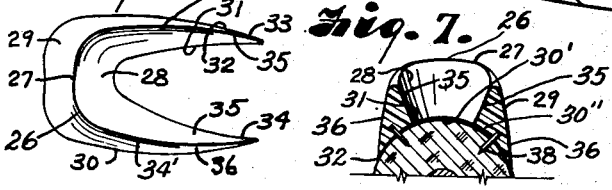 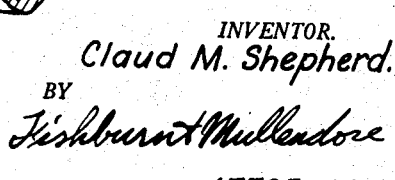
INVENTOR.
Claud M. Shepherd.
BY
ATTORNEYS.

2,711,047
THUMB REST FOR FISHING ROD

Claud M. Shepherd, Olathe, Kans.

Application May 18, 1953, Serial No. 355,530

1 Claim. (Cl. 43—23)

This invention relates to fishing rods and similar devices having handles on which the thumb of the hand must have a definite position for accurate use of the device. For example, in fly fishing, the handle of the fly rod is gripped in the palm of the hand with the thumb extending along the upper portion of the handle and the fingers gripping the underside. The position of the thumb has a major part in controlling the grip on the handle for attaining maximum distance and accuracy in casting of a fly or similar lure.

Therefore, the principal object of the present invention is to provide a thumb support or rest adapted for mounting in the required position on the handle.

Other objects of the invention are to provide a small, lightweight thumb rest that is adapted to be incorporated in the construction of a casting rod or may be applied as an attachment to the handles of existing rods; to provide a thumb rest which adequately locates the thumb and yet permits contact of the thumb with the surface of the handle to give a better grip by the thumb; and to provide a thumb rest of novel shape and having a base contour that is adapted to fit substantially any shape of fly rod or similar handle.

In accomplishing these and other objects of the invention hereinafter pointed out, I have provided improved structure, the preferred forms of which are illustrated in the accompanying drawing, wherein:

Fig. 1 is a perspective view of the handle end of a fly rod equipped with a thumb rest embodying the features of the present invention.

Fig. 2 is a cross sectional view through the handle of the rod taken along the line 2—2 of Fig. 1 particularly illustrating mounting or the attachment of the thumb rest.

Fig. 3 is a longitudinal section through the handle of the rod and the thumb rest that is incorporated therein.

Fig. 4 is a fragmentary perspective view of a handle of a fly rod equipped with a modified form of thumb rest which is particularly adapted for use as an attachment to any existing fly rod handle or like device which requires a thumb rest.

Fig. 5 is an underneath perspective view of the form of invention illustrated in Fig. 4.

Fig. 6 is a top plan view of the form of invention illustrated in Fig. 5.

Fig. 7 is a cross sectional view taken along the line 7—7, Fig. 4, particularly illustrating the prongs for retaining the thumb rest on the handle while an attaching cement is taking its set.

Referring more in details to the drawing:

1 designates the handle end of a fly rod which includes a shaft 2 having a portion 3 extending through the handle 4 for carrying the reel 5 as in standard fly rod construction. The handle 4 usually includes a series of washers 6 that are formed of cork or similar material which are sleeved on the portion 3 of the rod and secured together by an adhesive or the like to form a handle of generally circular cross-section and having tapering portions forming a continuous exterior gripping surface 7. In accordance with the present invention, a thumb rest 8 is also incorporated in the handle of the rod. In the form of invention illustrated in Fig. 1 the thumb rest 8 is sleeved on the portion 3 of the handle and retained between certain of the foremost washers 6 as now to be described.

In this form of the invention the thumb rest 8 is an integral part of a sleeve portion 9 which conforms in outer diameter with the gripping surface of the handle and is connected by radial webs 10 with an inner sleeve 11. The sleeve 11 has an axial bore 12 to receive the portion 3 of the shaft 2. The sleeves 9 and 11 are coextensive and the ends together with the ends of the webs 10 form abutments 13 and 14 for the adjacent washers 6 as shown in Fig. 3. The thumb rest portion 15 is formed as a boss 16 on the exterior of the outer sleeve 9 and is located on the shaft of the rod to give the desired position of the thumb when the rod is used in casting. The boss is substantially U-shape and has a semicircular end portion having an inner upwardly and outwardly inclined surface terminating in a ridge 17 which is also of general U-shape and of a size to permit entrance of the thumb. The outer face portion 18 of the boss slopes outwardly and downwardly from the ridge 17 to join with the sleeve at opposite sides of the handle. The boss 16 also includes leg or side portions 19 and 20 which extend in substantially parallel relation in the lengthwise direction of the handle to terminate in points 21 and 22 substantially at the end of the sleeve 9. The end and leg portions also have inner downwardly and inwardly sloping faces 15' defining limits of the thumb gripping portion of the rest. The inner and outer faces of the side portions also cooperate in forming continuations 17' of the ridge 17, which slope downwardly to a juncture of the inner and outer faces with the gripping surface of the handle. In assembling the handle the washers 6 and thumb rest are applied over the shaft and moved to abutting relation with the reel seat, the washers being cemented together.

In holding the rod for casting the ball of the thumb is placed within the cavity of the thumb rest and the fingers of the hand are extended under the rod to cooperate with the heel of the thumb in effecting a grip on the rod. When the rod is thus held it is properly balanced to permit the desired wrist action for attaining maximum distance and accuracy on casting of the fly or lure.

In the form of the invention illustrated in Fig. 4 the rest 26 is also of U-shape and of saddle-like form in that it is adapted for attachment on the handle of an existing fly rod. This form of invention also includes a U-shaped member having a semicircular end portion 27 extending transversely of the handle and has an inner face 28 tapering downwardly and inwardly to conform with the end of the thumb. The outer face 29 slopes outwardly and downwardly to provide a relatively wide base 30 having an arcuately concave seating face 30' for seating on the gripping surface of the handle and to extend downwardly at the sides thereof. The rest 26 also has leg or side portions 33 and 34 extending from the end portion in spaced apart relation to expose therebetween a portion of the gripping surface of the handle for contact by the ball of the thumb (see Figs. 4 and 7). The side portions have arcuate seating faces 30'' (Fig. 7) continuing from and substantially conforming with the arcuate seating face 30' of the end portion to engage the sides of the handle. The side and end portions also have downwardly and inwardly converging inner faces 35 and downwardly and outwardly sloping outer faces 36. The inner faces form inner edges 31 that diverge outwardly. The ridges 33' and 34' of the side portions 33 and 34 slope downwardly and converge with the terminals of the inner edges 31 and the corresponding outer edges 32 curve upwardly along the sides of the handle and terminate at the juncture of the edges 31 with the ridges 33' and 34'. With this arrangement, the rest is readily adjustable to the gripping surface of the handle and rest firmly and snugly thereon regardless of the taper of the gripping surface. The base portion of the thumb rest has a plurality of recesses 37 to receive cement or provide a vacuum to assist in retention of the rest on the handle when the rest is applied thereto as later described. In order to position the rest prior to setting of the cement the curved underfaces 30', 30" of the base may be provided with prongs 38 which are adapted to be pressed into the cork of the handle. The prongs are merely for temporarily retaining the rest while the proper position of the rest is determined. If the rest is not applied in its proper position it is readily lifted and relocated until the desired position is determined. After the proper position is found the rest is lifted and a cement is applied to the face portion of the base. The rest is then replaced with the prongs entering the openings previously made in the cork. Since the form of invention shown in Figs. 3 to 7 is of substantially saddle-shape and the seating face thereof is of substantially arcuate cross section as shown in Fig. 7. The rest will fit snugly any size or shape of standard fly rod handle so that the thumb rest will be securely retained over the entire contact face thereof.

In the form of invention illustrated in Fig. 4 the surface of the handle projects within the cavity formed by the rest with the result that the thumb contacts the handle to give a better thumb grip on the rod.

From the foregoing it is obvious that I have provided a thumb rest adapted to be formed of plastic or similar lightweight material so that it does not affect balance of the rod. It is also obvious that I have provided a thumb rest that is readily attached to existing rods after the required position has been determined, and that the thumb rest is readily secured by the cement to the handle of the rod.

Attention is called to the fact that the face of the base portion of the rest enhances the attachment and enhances retention of the rest on the handle of the rod.

While I have particularly illustrated and described the invention as applied to a fly rod, it is obvious that the invention is applicable to spinning rods and other devices in which a thumb brace or rest is desirable.

It is obvious that when the thumb rest or brace is applied as above described it becomes a permanent part of the rod and handle to which it is attached.

What I claim and desire to secure by Letters Patent is:

A thumb rest to facilitate holding of the handle of a casting rod within the hand and which handle has a gripping surface of generally circular cross-section throughout the length thereof and having tapering portions adapted to conform with the hand, said thumb rest including a U-shaped member having a substantially semicircular end portion for extending transversely of the handle and having a transverse arcuately concave under face adapted to bear transversely on the gripping surface of the handle and to extend downwardly in contact with opposite sides of the handle, side portions extending from said semicircular end portion and spaced apart and open therebetween to expose a portion of the gripping surface of the handle for direct contact by the ball of the thumb of the hand and having arcuate under faces continuing from and substantially corresponding with the arcuate under face of the end portion of said rest to contact the gripping surface of the handle, said end and the spaced apart side portions having downwardly and inwardly sloping inner faces for engagement by sides and end of the thumb and joining with said under faces of said spaced apart side portions in edges diverging from said end portion to accommodate the under faces of the thumb rest to the variable cross-section and taper of the gripping surface longitudinally of the handle, said spaced apart side portions having outer side faces joining with the under faces thereof in curving edges terminating with the inner edges in points whereby the thumb rest seats firmly and snugly on the gripping surface of the handle of the fishing rod, and prongs projecting from said under faces of the rest to penetrate the gripping surface of the handle for holding the rest on the handle for trial when determining a proper position of the thumb rest on the handle and for retaining the thumb rest during set of an adhesive that is applied to said seating surfaces when the rest is to be attached in said determined position.

References Cited in the file of this patent
UNITED STATES PATENTS

| 1,931,303 | Sturgis | Oct. 17, 1933 |
| 1,997,364 | Holden et al. | Apr. 9, 1935 |
| 2,177,433 | Hedge | Oct. 24, 1939 |